(12) United States Patent
Shigeru et al.

(10) Patent No.: US 8,709,616 B2
(45) Date of Patent: Apr. 29, 2014

(54) COOKING DEVICE AND METHOD OF MANUFACTURE OF THE SAME

(75) Inventors: Keijiro Shigeru, Chiyoda-ku (JP); Daisaku Maeda, Chiyoda-ku (JP); Yasunori Metsugi, Chiyoda-ku (JP); Akira Yazawa, Chiyoda-ku (JP); Taishi Maruyama, Chiyoda-ku (JP)

(73) Assignee: Sumitomo Osaka Cement, Co., Ltd., Tokyo (JP)

( * ) Notice: Subject to any disclaimer, the term of this patent is extended or adjusted under 35 U.S.C. 154(b) by 206 days.

(21) Appl. No.: 12/524,830

(22) PCT Filed: Jan. 30, 2008

(86) PCT No.: PCT/JP2008/051381
§ 371 (c)(1),
(2), (4) Date: Jul. 28, 2009

(87) PCT Pub. No.: WO2008/093715
PCT Pub. Date: Aug. 7, 2008

(65) Prior Publication Data
US 2010/0101429 A1    Apr. 29, 2010

(30) Foreign Application Priority Data

Jan. 30, 2007 (JP) ................. 2007-019588
Apr. 5, 2007 (JP) ................. 2007-099474
Sep. 27, 2007 (JP) ................. 2007-252352

(51) Int. Cl.
*A47J 27/00* (2006.01)
*B05D 3/02* (2006.01)
*B05D 1/38* (2006.01)

(52) U.S. Cl.
USPC ........ 428/701; 428/448; 428/457; 106/286.4; 99/324

(58) Field of Classification Search
None
See application file for complete search history.

(56) References Cited

U.S. PATENT DOCUMENTS

| 4,446,241 | A | * | 5/1984 | Francel et al. | .................. 501/14 |
| 5,137,779 | A | * | 8/1992 | Hinz et al. | ..................... 428/336 |
| 5,547,823 | A | * | 8/1996 | Murasawa et al. | ............ 430/531 |
| 6,368,668 | B1 | * | 4/2002 | Kobayashi et al. | ........ 427/376.2 |
| 6,582,839 | B1 | * | 6/2003 | Yamamoto et al. | ........... 428/702 |

(Continued)

FOREIGN PATENT DOCUMENTS

| CN | 1618888 A | 5/2005 |
| DE | 2743840 | * 4/1979 |

(Continued)

OTHER PUBLICATIONS

Office Action for Chinese Patent Application No. 200880003617.1 (Mar. 21, 2011) with English translation.

(Continued)

*Primary Examiner* — Vera Katz
(74) *Attorney, Agent, or Firm* — Merchant & Gould P.C.

(57) ABSTRACT

The cooking device of the present invention comprises a base material and a thin film that is formed on a surface of this base material, wherein said thin film contains silicon (Si), zirconium (Zr) and oxygen (O), and is such that when said silicon (Si) and said zirconium (Zr) are respectively converted to silicon oxide ($SiO_2$) and zirconium oxide ($ZrO_2$), the weight percent of said silicon oxide ($SiO_2$) relative to the total amount of said zirconium oxide ($ZrO_2$) and said silicon oxide ($SiO_2$) is 50 weight % or less.

4 Claims, 1 Drawing Sheet

(56) References Cited

U.S. PATENT DOCUMENTS

| | | | |
|---|---|---|---|
| 6,673,433 B1 * | 1/2004 | Saeki et al. | 428/323 |
| 2005/0095266 A1 * | 5/2005 | Perichaud et al. | 424/423 |
| 2005/0154112 A1 * | 7/2005 | Shigeru et al. | 524/430 |
| 2006/0211566 A1 * | 9/2006 | Champion et al. | 501/103 |
| 2010/0227177 A1 * | 9/2010 | Shigeru et al. | 428/448 |

FOREIGN PATENT DOCUMENTS

| | | | |
|---|---|---|---|
| EP | 1174479 A1 | | 1/2002 |
| JP | 60190569 A | * | 9/1985 |
| JP | A-04-310586 | | 11/1992 |
| JP | A-2000-017233 | | 1/2000 |
| JP | 2000-144057 A | | 5/2000 |
| JP | A-2001-316845 | | 11/2001 |
| JP | 2002-19007 | | 1/2002 |
| JP | 2002-80830 A | | 3/2002 |
| JP | 2002-302637 | | 10/2002 |
| JP | A-2002-363478 | | 12/2002 |
| JP | A-2003-064313 | | 3/2003 |
| JP | 2003-299606 | | 10/2003 |
| JP | 2003-301273 | | 10/2003 |
| JP | A-2004-307897 | | 11/2004 |
| JP | 2005-170057 | | 6/2005 |
| JP | T-2005-519829 | | 7/2005 |
| JP | 2005-281443 | | 10/2005 |
| JP | 2005281443 | * | 10/2005 |
| JP | 2005-321108 | | 11/2005 |
| JP | A-2005-325440 | | 11/2005 |
| JP | 2006-15754 | | 1/2006 |
| JP | 2006-16236 | | 1/2006 |
| JP | A-2007-161770 | | 6/2007 |
| JP | 2009-083131 | | 4/2009 |
| WO | WO 00/53689 A1 | | 9/2000 |
| WO | WO 00/68330 A1 | | 11/2000 |
| WO | WO 01/44592 | | 6/2001 |
| WO | WO 03/027348 A2 | | 4/2003 |
| WO | WO 03/080744 A1 | | 10/2003 |

OTHER PUBLICATIONS

Office Action for JP Application No. 2007-252352 (Apr. 3, 2012).
Office Action for JP Application No. 2008-018046 (Mar. 6, 2012).
International Search Report for International Publication No. PCT/JP2008/059912 (mailed Jul. 29, 2008).
Office Action for U.S. Appl. No. 12/601,489 (Jul. 12, 2011).
Office Action for Japanese Patent Application No. 2012-070326 (Apr. 16, 2013).
Office Action for Japanese Patent Application No. 2008-122683 (Jun. 25, 2013).

* cited by examiner

COOKING DEVICE AND METHOD OF MANUFACTURE OF THE SAME

This application is a National Stage Application of PCT/JP2008/051381, filed 30 Jan. 2008, which claims benefit of Serial No. 2007-019588, filed 30 Jan. 2007 in Japan, Serial No. 2007-099474, filed 5 Apr. 2007 in Japan, and Serial No. 2007-252352, filed 27 Sep. 2007 in Japan and which applications are incorporated herein by reference. To the extent appropriate, a claim of priority is made to each of the above disclosed applications.

TECHNICAL FIELD

The present invention relates to cooking device and its method of manufacture, and particularly to cooking device which enables simple removal of burnt-on food stains and oil stains that adhere during cooking merely by wiping with a damp cloth, and a method of manufacture which enables convenient manufacture of this cooking device with simple equipment.

In addition, the present invention relates to an anti-stain product and its method of manufacture, and particularly to cooking device which is provided with anti-stain properties enabling prevention of fixation of burnt-on stains that occur due to heating of organic matter such as food products during cooking of food products to the base material of the product, and enabling easy removal by water washing even if burnt-on stains are affixed at high temperatures of 300° C. or more, and to its method of manufacture.

BACKGROUND ART

In order to simply remove burnt-on food stains on cooking device that requires heating of plates and oven dishes for grilled meat and the like, cooking device has previously been proposed, for example, that forms a thin film whose primary ingredient is zirconium oxide on the surface of the base material (see, e.g., Patent Document 4).

In addition, anti-stain products have previously been proposed which are configured by forming a thin film containing silicon dioxide, zirconium oxide, and phosphoric acid on the surface of a base material of the product, and incorporating lithium ions in this thin film in a dispersed state (see, e.g., Patent Documents 1-3). It is held that such anti-stain products inhibit staining, and that stains are easily removable even once staining has occurred.

As a method of manufacture of anti-stain products that are provided with such properties, a method has been proposed wherein a lithium compound is brought into contact under heating with a thin film containing silicon dioxide and zirconium oxide that has been formed on a base material of the product, and lithium ions are diffused from the surface toward the interior of the aforementioned thin film, whereby lithium ions are incorporated into the thin film in a dispersed state.

Patent Document 1: Japanese Unexamined Patent Application, First Publication No. 2002-019007
Patent Document 2: Japanese Unexamined Patent Application, First Publication No. 2005-170057
Patent Document 3: Japanese Unexamined Patent Application, First Publication No. 2006-015754
Patent Document 4: Japanese Unexamined Patent Application, First Publication No. 2005-321108

DISCLOSURE OF THE INVENTION

Problems that the Invention is to Solve

However, with respect to the aforementioned conventional cooking device, although burnt-on food stains can be removed relatively simply, there is the problem that oil stains cannot be easily removed merely by the operation of wiping with a damp cloth.

Thus, there is strong demand for the development of cooking device that enables simple removal not only of burnt-on food stains, but also of oil stains.

In addition, with the aforementioned conventional anti-stain products, once a burnt-on stain is affixed to the product, it is necessary to use a physical method such as scrubbing or the like to remove this burnt-on stain, and there is the problem that the surface of the product may be scratched when using this physical method, and that it is not possible to effectively prevent fixation of burnt-on stains to the base material of the product.

Furthermore, with the aforementioned conventional cooking device, although burnt-on food stains that have been burnt on at low temperatures of 250° C. or less can be removed relatively simply, burnt-on food stains that have been burnt on at high temperatures of 300° C. or more cannot be simply removed. As with the aforementioned anti-stain products, one is compelled to use a physical method such as rubbing in order to remove such burnt-on stains, and there is the problem that the surface of the cooking device may be scratched when using this physical method.

The present invention was made in order to solve the aforementioned problems, and its object is to offer cooking device which enables burnt-on food stains and oil stains that have adhered during cooking to be simply removed merely by wiping with a damp cloth, and its method of manufacture.

A further object of the present invention is to offer anti-stain products which enable prevention of fixation of burnt-on stains that originate in organic matter such as food products, and which enable easy removal by water washing even if burnt-on stains are affixed at high temperatures of 300° C. or more, and their method of manufacture, and among these, particularly cooking device and its method of manufacture.

Means for Solving the Problems

As a result of diligent study aimed at solving the aforementioned problems, the present inventors and others discovered that if a thin film of specific composition which contains silicon (Si), zirconium (Zr), and oxygen (O) is formed at least on the part of the surface of a base material where there is risk of contact by food products or where there is risk of occurrence of oil stains, it is possible to simply remove burnt-on food stains and oil stains that have adhered during cooking merely by wiping with a damp cloth. In addition, the present inventors and others discovered that if either a thin film of specific composition containing silicon (Si), zirconium (Zr), oxygen (O), and phosphorus (P), or a thin film of specific composition containing zirconium (Zr), oxygen (O), and phosphorus (P) is formed on the surface of the base material, it is possible to prevent fixation of burnt-on stains originating in organic matter such as food products to the surface of the base material, and conduct easy removal by water washing even if such burnt-on stains are affixed to the base material, thereby perfecting the present invention.

That is, the present invention is a cooking device which is provided with a base material and a thin film that is formed on a surface of this base material, and which is constituted by forming the thin film in such a way that the aforementioned thin film contains silicon (Si), zirconium (Zr) and oxygen (O), and is such that when the aforementioned silicon (Si) and the aforementioned zirconium (Zr) are respectively converted to silicon oxide ($SiO_2$) and zirconium oxide ($ZrO_2$), the weight percent of the aforementioned silicon oxide ($SiO_2$) relative to the total amount of the aforementioned zirconium oxide ($ZrO_2$) and the aforementioned silicon oxide ($SiO_2$) is 50 weight % or less.

With respect to the cooking device of the present invention, it is preferable that the aforementioned thin film further contain phosphorus (P), and that the aforementioned phosphorus (P) be distributed at least in the surface layer of the aforementioned thin film.

The present invention is a cooking device which is provided with a base material and a thin film that is formed on a surface of this base material, wherein the aforementioned thin film contains zirconium (Zr), oxygen (O) and phosphorus (P), and the aforementioned phosphorus (P) is distributed at least in the surface layer of the aforementioned thin film.

With respect to the cooking device of the present invention, it is preferable that the aforementioned weight percent be 1 weight % or more and 40 weight % or less.

With respect to the cooking device of the present invention, it is more preferable that the aforementioned weight percent be 1 weight % or more and 20 weight % or less.

With respect to the cooking device of the present invention, the aforementioned weight percent may be in excess of 20 weight % and 40 weight % or less.

With respect to the cooking device of the present invention, it is preferable that the thickness of the aforementioned thin film be 0.01 μm or more and 10 μm or less.

The present invention is a method of manufacture of cooking device wherein a coating composition—which contains a solvent, a silicon component, and one or two or more types of zirconium component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less, and which is such that when the aforementioned zirconium component and the aforementioned silicon component are respectively converted to zirconium oxide ($ZrO_2$) and silicon oxide ($SiO_2$), the weight percent of the aforementioned silicon oxide ($SiO_2$) relative to the total amount of the aforementioned zirconium oxide ($ZrO_2$) and the aforementioned silicon oxide ($SiO_2$) is 50 weight % or less—is applied to at least part of a surface of a base material to form a coating film, after which this coating film is subjected to heat treatment at a temperature of 100° C. or higher.

With respect to the method of manufacture of cooking device of the present invention, it is preferable that the aforementioned coating composition be subjected to heat treatment at 200° C. or higher.

With respect to the method of manufacture of cooking device of the present invention, it is preferable that the aforementioned coating composition further contain a phosphorus (P) component.

The present invention is a method of manufacture of cooking device wherein a coating composition—which contains a solvent, a silicon (Si) component, and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less, and which is such that when the aforementioned zirconium (Zr) component and the aforementioned silicon (Si) component are respectively converted to zirconium oxide ($ZrO_2$) and silicon oxide ($SiO_2$), the mass percent of the aforementioned silicon oxide ($SiO_2$) relative to the total amount of the aforementioned zirconium oxide ($ZrO_2$) and the aforementioned silicon oxide ($SiO_2$) is 50 mass % or less—is applied to at least part of a surface of the aforementioned base material to form a coating film, after which this coating film is subjected to heat treatment at a temperature of 100° C. or higher to produce a thin film, after which a solution or dispersion liquid including a phosphorus (P) component is applied onto this thin film, and subjected to heat treatment at a temperature of 100° C. or higher, whereby the aforementioned phosphorus (P) component is incorporated into at least a surface layer of the aforementioned thin film.

The present invention is a method of manufacture of cooking device wherein a coating composition—which contains a solvent, a phosphorus (P) component, and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less—is applied to at least part of a surface of the aforementioned base material to form a coating film, after which this coating film is subjected to heat treatment at a temperature of 100° C. or higher.

The present invention is a method of manufacture of cooking device wherein a coating composition—which contains a solvent, and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less—is applied to at least part of the surface of the aforementioned base material to form a coating film, after which this coating film is subjected to heat treatment at a temperature of 100° C. or higher to produce a thin film, after which a solution or dispersion liquid including a phosphorus (P) component is applied onto this thin film, and subjected to heat treatment at a temperature of 100° C. or higher, whereby the aforementioned phosphorus (P) component is incorporated into at least the surface layer of the aforementioned thin film.

In the method of manufacture of cooking device of the present invention, it is preferable that the aforementioned chelate compound of zirconium alkoxide be a reaction product between zirconium alkoxide and one or two or more types of compound selected from the group consisting of ethanol amine, β-diketone, β-keto acid ester, and carboxylic acid.

In the method of manufacture of cooking device of the present invention, it is preferable that the aforementioned chelate compound of hydrolysate of zirconium alkoxide be a reaction product between hydrolysate of zirconium alkoxide and one or two or more types of compound selected from the group consisting of ethanol amine, β-diketone, β-keto acid ester, and carboxylic acid.

Effects of the Invention

According to the cooking device of the present invention, as a thin film of specific composition containing silicon (Si), zirconium (Zr), and oxygen (O) is formed on at least part of the surface of the base material, even when food product adhesions are burnt on during cooking or when oil stain adhesions occur, these burnt-on food stains and oil stains can be simply removed merely by wiping with a damp cloth. In particular, when the aforementioned weight percent is 1 weight % to 20 weight %, the removability of burnt-on food stains is remarkably excellent. Of course, the ease of removal of oil stains and the water resistance of the thin film are also satisfactory. When the aforementioned weight percent is above 20 weight % to 40 weight %, the removability of oil stains is remarkably excellent. Of course, the ease of removal of burnt-on food stains and the water resistance of the thin film are also satisfactory.

In addition, according to the anti-stain products—that is, cooking device—of the present invention, as either a thin film of specific composition containing silicon (Si), zirconium (Zr), oxygen (O), and phosphorus (P) or a thin film of specific composition containing zirconium (Zr), oxygen (O), and phosphorus (P) is formed on the surface of the base material, the thin film that is formed on the surface of the base material has excellent anti-stain properties relative to burnt-on stains originating in organic matter such as food products, thereby enabling prevention of fixation of burnt-on stains originating in organic matter such as food products. Even if burnt-on stains are affixed at high temperatures of 300° C. or more, these burnt-on stains can be easily removed by water washing. Moreover, this thin film is also provided with excellent anti-stain properties relative to other types of stains such as oil stains, water stains, and animal excrement (e.g., feces).

According to the method of manufacture of cooking device of the present invention, cooking device in which a thin film of specific composition containing silicon (Si), zirconium (Zr), and oxygen (O) is formed on at least part of the surface of the base material can be conveniently manufactured with simple equipment.

In addition, according to the method of manufacture of anti-stain products—that is, cooking device—of the present invention, it is possible to prevent fixation of burnt-on stains originating in organic matter such as food products, and even if burnt-on stains are affixed at high temperatures of 300° C. or more, these burnt-on stains can be easily removed by water washing. Furthermore, it is possible to conveniently and inexpensively manufacture anti-stain products which are also provided with excellent anti-stain properties relative to other types of stains such as oil stains, water stains, and animal excrement (e.g., feces).

DESCRIPTION OF THE REFERENCE SYMBOLS

Figure 1:
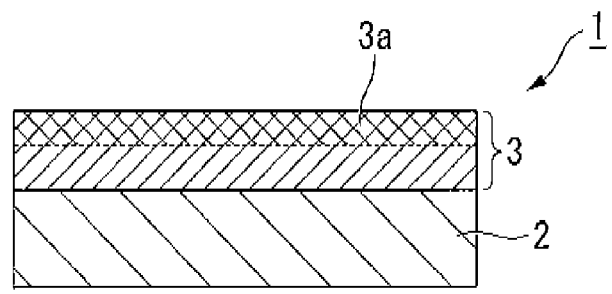
FIG. 1 is a cross-sectional view which shows the anti-stain product of a second embodiment of the present invention.

1: anti-stain product, 2: base material, 3: thin film, 3a surface layer, 11: anti-stain product, 12: thin film, 21: anti-stain product, 22: thin film, 22a: surface layer, 31: anti-stain product, 32: surface layer

BEST MODE FOR CARRYING OUT THE INVENTION

A description will now be given of the best mode for implementing the cooking device and its method of manufacture of the present invention.

This mode is described in detail in order to facilitate understanding of the intent of the invention, and does not limit the present invention unless there is a particular designation to that effect.

First Embodiment

The cooking device of the present embodiment farms a thin film—which contains silicon (Si), zirconium (Zr), and oxygen (O), and which is such that when the aforementioned silicon (Si) and the aforementioned zirconium (Zr) are respectively converted to silicon oxide ($SiO_2$) and zirconium oxide ($ZrO_2$), the weight percent of the aforementioned silicon oxide ($SiO_2$) relative to the total amount of the aforementioned zirconium oxide ($ZrO_2$) and the aforementioned silicon oxide ($SiO_2$) is 1 weight % or more and 40 weight % or less—at least on part of the surface of the base material that configures the body of the cooking device, that is, at least in the region of this surface where there is risk of contact by food products or where there is risk of occurrence of oil stains. The aforementioned weight percent may also be 50 weight % or less.

This cooking device is a collective term that refers to various types of implements used for cooking food products and various types of kitchen equipment accessories. For example, it refers not only to frying pans, pots, cooking plates, water bowls for grilling fish, and baking racks, but also extends to stove baking sheets, stove parts, stove parts, internal parts of ovens, etc., which are used at food preparation sites such as indoor kitchens and cookeries.

As to the material of this cooking device, the type of material is a matter of indifference, and may include metal materials such as steel, stainless steel, aluminum, and copper, ceramic materials such as glass and zirconia, mete-ceramic composites such as enamel, and so on.

As to the regions where this thin film is formed, it is required at least in regions where there is risk of contact by food products or in regions where there is risk of occurrence of oil stains, and a configuration may, of course, be adopted wherein the aforementioned thin film is formed without omission over the entire surface.

in this instance, the reason why the composition of the thin film is made such that when the aforementioned silicon (Si) and the aforementioned zirconium (Zr) are respectively converted to silicon oxide ($SiO_2$) and zirconium oxide ($ZrO_2$), the weight percent of the aforementioned silicon oxide ($SiO_2$) relative to the total amount of the aforementioned zirconium oxide ($ZrO_2$) and the aforementioned silicon oxide ($SiO_2$) is 50 weight % or less is that when the weight percent of silicon oxide ($SiO_2$) exceeds 50 weight %, although oil stains can be removed merely by wiping with a damp cloth, burnt-on food stains cannot be removed merely by wiping with a damp cloth.

Here, when the aforementioned weight percent is limited to a range of 1 weight % or more and 20 weight % or less, the ease of removal of burnt-on food stains is particularly excellent. Of course, the ease of removal of oil stains and the water resistance of the thin film is also satisfactory.

Moreover, when the aforementioned weight percent is limited to a range of more than 20 weight % and 40 weight % or less, the removability of oil stains is particularly excellent. Of course, the ease of removal of burnt-on food stains and the water resistance of the thin film is also satisfactory.

When the composition of this thin film is considered in terms of water repellency and hydrophilicity, it exhibits water repellency because zirconium oxide ($ZrO_2$) does not have hydrophilic groups (—OH) at the surface, and it exhibits hydrophilicity because silicon oxide ($SiO_2$) has hydrophilic groups (—OH) at the surface. Accordingly, when silicon oxide ($SiO_2$) is introduced to zirconium oxide ($ZrO_2$) that exhibits water repellency so that weight percent becomes 1 weight % to 40 weight %, this thin film which is composed of zirconium oxide ($ZrO_2$) with silicon oxide ($SiO_2$) content combines water repellency and hydrophilicity in proper degree. The aforementioned weight percent may also be 50 weight % or less.

It is preferable that the thickness of this thin film be 0.01 μm or more and 10 μm or less.

It is undesirable for the thickness of this thin film to fall below 0.01 μm as the impartation of anti-stain properties (ease of removal of burnt-on food stains and oil stains) is then insufficient. On the other hand, it is undesirable for thickness to exceed 10 μm, because the impact resistance of the thin film declines, rendering it prone to cracking, and because transparency declines, and design properties such as the hue of the cooking device itself deteriorate.

This cooking device can be manufactured, for example, by a first manufacturing method described below.

That is, a first coating composition—which contains a solvent, a silicon component, and one or two or more types of zirconium component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less, and which is such that when the aforementioned zirconium component and the aforementioned silicon component are respectively converted to zirconium oxide ($ZrO_2$) and silicon oxide ($SiO_2$), the weight percent of the aforementioned silicon oxide relative to the total amount of the aforementioned zirconium oxide and the aforementioned silicon oxide is 1 weight % or more and 40 weight % or less—is applied to at least part of the surface of a bast material to form a coating film, after which this coating film is subjected to heat treatment at a temperature of 200° C. or higher. The aforementioned weight percent may also be 50 weight % or less. Moreover, the heat treatment of the aforementioned coating film is not limited to an ambient air medium, and may be conducted in other atmospheric mediums. Furthermore, the heat treatment of the aforementioned coating film may also be conducted at a temperature of 100° C. or higher.

There are no particular limitations on the aforementioned zirconium alkoxide of this coating composition. One may cite, for example, zirconium tetra-normal-butoxide and zirconium tetrapropoxide. As this zirconium tetra-normal-butoxide and zirconium tetrapropoxide have a proper hydrolytic rate, and as they are easy to handle, they enable formation of a thin film of uniform film quality.

There are no particular limitations on the hydrolysate of zirconium alkoxide. One may cite, for example, hydrolysate of zirconium tetra-normal-butoxide and hydrolysate of zirconium tetrapropoxide. There are no particular limitations on the hydrolytic rate of these hydrolysates, and one within a range from above 0 mol % to 100 mol % may be used.

As these zirconium alkoxides and hydrolysates of zirconium alkoxide are highly hygroscopic, are unstable, and lack sufficient storage stability, they require extreme care when handled.

From the standpoint of ease of handling, chelate compounds of zirconium alkoxide and chelate compounds of hydrolysate of zirconium alkoxide, which chelatize these zirconium alkoxides and hydrolysates of zirconium alkoxide, are preferable.

As the aforementioned chelate compounds of zirconium alkoxide, one may cite the reaction products between zirconium alkoxide and one or two or more types of hydrolysis inhibitor (compound) selected from the group consisting of ethanolamines such as monoethanolamine, diethanolamine, and triethanolamine; β-diketones such as acetyl acetone; β-keto acid esters such as methyl acetoacetate, ethyl acetoacetate, diethyl malonate, and ethyl phenoxyacetate; and carboxylic acids such as acetic acid, lactic acid, citric acid, benzoic acid, and malic acid. Here, a hydrolysis inhibitor is a compound which forms a chelate compound with zirconium alkoxide, and which has the effect of inhibiting hydrolytic reaction of this chelate compound.

In addition, as chelate compounds of hydrolysate of zirconium alkoxide, one may cite the reaction products between zirconium alkoxide and one or two or more types of hydrolysis inhibitor (compound) selected from the group consisting of ethanolamines such as monoethanolamine, diethanolamine, and triethanolamine; β-diketones such as acetyl acetone; β-keto acid esters such as methyl acetoacetate, ethyl acetoacetate, diethyl malonate, and ethyl phenoxyacetate; and carboxylic acids such as acetic acid, lactic acid, citric acid, benzoic acid, and malic acid. The definition of hydrolysis inhibitor is as stated above.

It is preferable that the proportion of this hydrolysis inhibitor relative to zirconium alkoxide or hydrolysate of zirconium alkoxide be 0.5 mol-fold to 4 mol-fold, and preferably 1 mol-fold to 3 mol-fold relative to the zirconium (Zr) contained in this zirconium alkoxide or hydrolysate of zirconium alkoxide.

This is because when the proportion is less than 0.5 mol-fold, the stability of the coating composition is insufficient, and, on the other hand, when it exceeds 4 mol-fold, the hydrolysis inhibitor remains in the thin film even after heat treatment, with the result that hardness of the thin film declines.

With respect to these chelate compounds of zirconium alkoxide and chelate compounds of hydrolysate of zirconium alkoxide, it is sufficient to dissolve zirconium alkoxide or hydrolysate of zirconium alkoxide in a solvent, to further add a hydrolysis inhibitor, and to produce a chelating reaction in the obtained solvent.

As the aforementioned silicon component, there are no particular limitations so long as it is a silicon compound that is capable of becoming silicon oxide by heat treatment. One may cite, for example, colloidal silica, silicon alkoxide, and hydrolysate of silicon alkoxide. With respect to the hydrolytic rate of this hydrolysate, there are no particular limitations, and one may use hydrolysate that is within a range from above 0 mol % to 100 mol %.

As the aforementioned solvent, one may use solvent without any particular limitation so long as it is able to dissolve or disperse the aforementioned zirconium component and silicon component. For example, water, lower alcohols such as methanol, ethanol, 2-propanol and 1-butanol are suitable for use. Particularly when water is used as the solvent, it is undesirable to have an amount of water that is at or above the amount of hydrolysis of the alkoxide, as this lowers the stability of the coating composition.

Here, when zirconium alkoxide and/or hydrolysate of zirconium alkoxide is used as the zirconium component, or when silicon alkoxide and/or hydrolysate of silicon alkoxide is used as the silicon component, it is acceptable to add a catalyst that controls the hydrolytic reaction of this zirconium component or silicon component.

As this catalyst, one may cite inorganic acids such as hydrochloric acid and nitric acid, organic acids such as citric acid and acetic acid, etc. As the additive amount of this catalyst, 0.01-10 weight % of the total amount of the zirconium component and silicon component in the coating composition is normally preferable. Excessive addition of catalyst is undesirable, as it risks corroding the heat treatment furnace during heat treatment.

With respect to this point, it is preferable when a chelate compound of zirconium alkoxide or a chelate compound of hydrolysate of zirconium alkoxide is used as the zirconium component, and when colloidal silica is used as the silicon component, because there is no need to add acid as a catalyst that controls the hydrolytic reaction, and accordingly no risk of corroding the heat treatment furnace during heat treatment.

With respect to the total content rate of the zirconium component and the silicon component in this coating composition, when the zirconium component and the silicon component are respectively converted to zirconium oxide ($ZrO_2$) and silicon oxide ($SiO_2$), it is preferable that the total content rate of the zirconium oxide and the silicon oxide be 1 weight % or more and 10 weight % or less.

It is undesirable when the total content rate falls below 1 weight %, because it is difficult to form a thin film of the prescribed film thickness. On the other hand, it is undesirable when the total content rate exceeds 10 weight %, because it causes the prescribed film thickness to be exceeded, and the thin film to whiten and peel.

Next, the aforementioned coating composition is applied to at least part of the surface of the base material which configures the body of the cooking device, that is, at least to the region where there is risk of contact by food products or risk of occurrence of oil stains. There are no particular limitations as to the application method, and one may use the spray method, dipping method, brushing method, etc. With respect to application, it is preferable to prepare the thickness of the coating film so that film thickness after heat treatment is within the range of 0.1 μm to 10 μm.

The coating film obtained in this manner is subjected to heat treatment in the ambient atmosphere at a temperature of 200° C. or higher, or more preferably at 400° C. or higher, or still more preferably at 500° C. or higher. There are no particular limitations on the atmospheric medium during heat treatment, and it is normally conducted in the ambient air.

The thin film obtained in this manner has any one of the following compositions (1) to (4).

(1) An inorganic substance wherein a chemical bond expressed by the following formula (1)

(Formula 1)

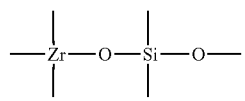

(1)

in which silicon (Si) atoms and zirconium (Zr) atoms bond with interposition of oxygen (O) atoms is configured by silicon-zirconium oxide that is present in the molecular skeleton, and wherein this silicon-zirconium oxide forms a three-dimensional mesh structure.

(2) An inorganic substance wherein a chemical bond expressed by the following formula (2)

(Formula 2)

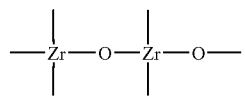

(2)

in which mated zirconium (Zr) atoms bond with interposition of oxygen (O) atoms is configured by zirconium oxide that is present in the molecular skeleton, wherein this zirconium oxide forms a three-dimensional mesh structure, and wherein fine particles of silicon oxide are enclosed in this three-dimensional mesh structure.

(3) An inorganic substance in which silicon oxide fine particles and zirconium oxide fine particles are mutually dispersed.

(4) An inorganic substance in which two or more of the aforementioned (1) to (3) exist in a mixed state.

As described above, according to the cooking device of the present embodiment, as a thin film—which contains silicon (Si), zirconium (Zr), and oxygen (O), and which is such that when the silicon (Si) and the zirconium (Zr) are respectively converted to silicon oxide ($SiO_2$) and zirconium oxide ($ZrO_2$), the weight percent of the silicon oxide ($SiO_2$) relative to the total amount of zirconium oxide ($ZrO_2$) and silicon oxide ($SiO_2$) is 1 weight % or more and 40 weight % or less—is formed on at least part of the surface of the base material, it is possible to simply remove not only burnt-on food stains, but also oil stains merely by wiping with a damp cloth. The aforementioned weight percent may also be 50 weight % or less.

Moreover, as the primary component of the aforementioned thin film is zirconium oxide ($ZrO_2$) which is a high refractive index material, the refractive index is large, a profound reflection is obtained, the cooking device is visually beautiful, and its design properties are also enhanced.

According to the method of manufacture of the cooking device of the present embodiment, as a coating composition—which contains a solvent, a silicon component, and one or two or more types of zirconium component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less, and which is such that when the zirconium component and the silicon component are respectively converted to zirconium oxide ($ZrO_2$) and silicon oxide ($SiO_2$), the weight percent of the silicon oxide relative to the total amount of zirconium oxide and silicon oxide is 1 weight % or more and 40 weight % or less—is applied to at least part of the surface of a base material to form a coating film, after which this coating film is subjected to heat treatment at a temperature of 200° C. or higher, the cooking device of this embodiment can be conveniently manufactured with simple equipment. The aforementioned weight percent may also be 50 weight % or less. Moreover, the heat treatment of the aforementioned coating film is not limited to an ambient air medium, and may be conducted in other atmospheric mediums. Furthermore, the heat treatment of the aforementioned coating film may also be conducted at a temperature of 100° C. or higher.

Second Embodiment

FIG. 1 is a cross-sectional view which shows the anti-stain product of a second embodiment of the present invention. An anti-stain product 1 is constituted by a base material 2 which composes the body of the anti-stain product, and a thin film 3 which is formed on the surface of this base material 2 in at least the region where there is risk of fixation of burnt-on stains, and which contains silicon (Si), zirconium (Zr), oxygen (O), and phosphorus (P). The phosphorus (P) is dispersed at least in a surface layer 3a of this thin film 3.

As the anti-stain product 1, there are no particular limitations, and it is sufficient if the product requires anti-stain properties relative to burnt-on stains originating in organic matter such as food products. This collectively refers not only to various types of cooking device such as, for example, frying pans, pots, cooking plates, water bowls for grilling fish, and baking racks, which are used in kitchens and food preparation sites, but also to various types of cooking equipment used to cook food such as stove baking sheets, konro parts, stove parts, and internal parts of ovens.

The base material 2 composes the body of the anti-stain product 1. With respect to its shape, various shapes may be selected for use according to the contours and specifications of the target implement, equipment, member, etc. As to the material, the type of material is a matter of indifference so long as it is capable of heat treatment at a temperature of 100° C. or higher, e.g., various metals such as steel and stainless steel, ceramics including various types of heat-resistant glass such as low thermal expansion crystallized glass, metal-ceramic composites such as enamel, etc.

The thin film 3 contains silicon (Si), zirconium (Zr), oxygen (O), and phosphorus (P), and is such that when the silicon (Si) and the zirconium (Zr) are respectively converted to silicon oxide ($SiO_2$) and zirconium oxide ($ZrO_2$), the mass percent of the silicon oxide ($SiO_2$) relative to the total amount of zirconium oxide ($ZrO_2$) and silicon oxide ($SiO_2$) is 50 mass % or less, and preferably 1 mass % or more and 20 mass % or less. The phosphorus (P) is dispersed in at least the surface layer 3a of this thin film 3.

The surface layer 3a containing this phosphorus (P) has excellent anti-stain properties relative to burnt-on stains and the like. Moreover, as this surface layer 3a contains silicon oxide ($SiO_2$), it has excellent water resistance and adhesion to the base material 2.

In this instance, the reason why the mass percent of the silicon oxide ($SiO_2$) relative to the total amount of zirconium oxide ($ZrO_2$) and silicon oxide ($SiO_2$) is 50 mass % or less is that when the mass percent of silicon oxide ($SiO_2$) exceeds 50 mass %, it is not possible to prevent fixation of burnt-on stains, and furthermore, once affixed, burnt-on stains cannot be removed merely by wiping with a damp cloth.

In particular, it is preferable when the mass percent of silicon oxide ($SiO_2$) is 1 mass % or more and 20 mass % or less, because fixation of burnt-on stains can be still more efficiently prevented, and because even if burnt-on stains become affixed at high temperatures of 300° C. or higher, these burnt-on stains can be still more efficiently and easily removed by water washing.

It is preferable that the thickness of the thin film 3 be 0.001 μm or more and 10 μm or less.

It is undesirable for the thickness of this thin film 3 to fall below 0.001 μm, as the impartation of anti-stain properties—i.e., anti-stain properties relative to burnt-on stains and ease of removal of burnt-on stains once affixed—is then insufficient. On the other hand, it is undesirable for thickness to exceed 10 μm, because the impact resistance of the thin film 3 itself declines, rendering it prone to cracking.

Particularly in order to prevent the occurrence of interference colors, it is optimal to set the thickness of the thin film 3 at 0.1 μm or less.

The thickness of this surface layer 3a is determined by the heat treatment conditions in the below-mentioned "second process" of a second manufacturing method, but under normal heat treatment conditions, it would be at least 0.0001 μm or more from the surface of the thin film 3, and preferably 0.005 μm or more. The concentration of the phosphorus (P) in this surface layer 3a is not particularly limited, but is 0.001 mass % or more and 10 mass % or less, and preferably 0.1 mass % or more and 10 mass % or less, and has a concentration gradient such that concentration gradually decreases in the depthwise direction from the surface of this thin film 3.

When the concentration of phosphorus (P) in this surface layer 3a falls below 0.001 mass %, burnt-on stains which are burnt on and affixed at high temperatures of 300° C. or more cannot be removed merely by wiping with a damp cloth. On the other hand, it is undesirable when the concentration of phosphorus (P) in the surface layer 3a exceeds 10 mass %, as the water resistance and wear resistance of the thin film 3 diminishes.

The anti-stain product 1 on which is formed the thin film 3 having this type of surface layer 3a can effectively prevent fixation of burnt-on stains, and enables simple removal merely by wiping with a damp cloth even when burnt-on stains are burnt on at high temperatures of 300° C. or more.

In addition, the thin film 3 having this surface layer 3a exhibits excellent durability.

The reason why the surface layer 3a of this thin film 3 demonstrates anti-stain effects is thought to be closely related to the bonding state of the oxygen (O) atoms with the respective atoms of silicon (Si), Zirconium (Zr) and phosphorus (P) which are the constituent components of the surface layer 3a.

Here, two representative types of bonding states are described.

(1) As shown in the below structural formula (3), there is the case where one silicon (Si) atom is chemically bonded with four oxygen (O) atoms, and each oxygen (O) atom has one bonding extremity.

(Formula 3)

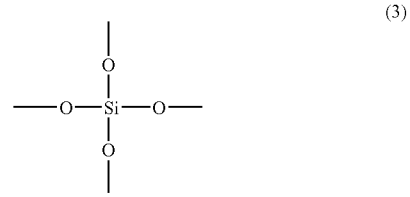

In this case, portions of the bonding extremities of the oxygen (O) atoms bond with hydrogen to constitute a hydroxyl group (—OH), and exhibit hydrophilicity. When the surface layer 3a of the thin film 3 exhibits hydrophilicity, burnt-on stains are more firmly affixed in the case where hydrophilic organic substances typified by proteins and the like sustain thermal effects and are burnt on.

(2) As shown in the below structural formula (4), there is the case where one zirconium (Zr) atom chemically bonds with three oxygen (O) atoms, and one of the oxygen (O) atoms among these oxygen (O) atoms is double bonded, while, while the other oxygen (O) atoms each have one bonding extremity.

(Formula 4)

In this case, portions of the bonding extremities of these oxygen (O) atoms bond with hydrogen to constitute hydroxyl groups (—OH), and exhibit hydrophilicity. When the surface layer 3a of the thin film 3 exhibits hydrophilicity, burnt-on stains are more firmly affixed when hydrophilic organic substances typified by proteins and the like sustain thermal effects and are burnt on.

When phosphorus (P) is included in the thin film 3 which has this type of chemical bonding of silicon (Si) atoms and oxygen (O) atoms and chemical, bonding of zirconium (Zr)

atoms and oxygen (O) atoms, as shown in the below structural formula (5), for example, the phosphorus (P) crosslinks with the bonding extremities of the oxygen (O) atoms by dehydration-condensation reaction, and double bonding also occurs. As these double bonds are not hydroxyl groups (—OH), they have a certain degree of water repellency.

(Formula 5)

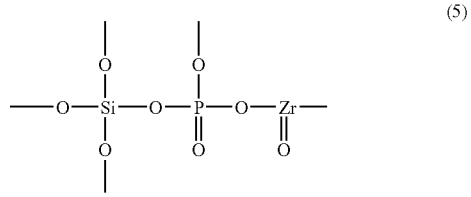

(5)

As a result, the surface layer 3a of the thin film 3 is provided with the proper degree of hydrophilicity and water repellency relative to burnt-on stains. Consequently, the adhesion of burnt-on stains to the base material 2 is lowered, fixation of burnt-on stains is effectively prevented, and simple removal merely by wiping with a damp cloth is possible even when burnt-on stains are burnt on at high temperatures of 300° C. or higher.

This anti-stain product 1 can be manufactured, for example, by the following second manufacturing method.

That is, the second manufacturing method has: a first process wherein a second coating composition—which contains a solvent, a silicon (Si) component, and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less, and which is such that when the zirconium (Zr) component and the silicon (Si) component are respectively converted to zirconium oxide ($ZrO_2$) and silicon oxide ($SiO_2$), the mass percent of the silicon oxide ($SiO_2$) relative to the total amount of zirconium oxide ($ZrO_2$) and silicon oxide ($SiO_2$) is 50 mass % or less, and preferably 1 mass % or more and 20 mass % or less—is applied to the surface of the base material 2 to form a coating film, after which this coating film is subjected to heat treatment at a temperature of 100° C. or higher to produce a thin film; followed by a second process wherein a solution or dispersion liquid including a phosphorus (P) component is applied onto this thin film, and the phosphorus (P) component is incorporated into the thin film by conducting heat treatment at a temperature of 100° C. or higher, and preferably 200° C. or higher.

As the aforementioned zirconium alkoxide in this second coating composition, there are no particular limitations, and one may cite, for example, zirconium tetra-normal-butoxide and zirconium tetrapropoxide. As this zirconium tetra-normal-butoxide and zirconium tetrapropoxide have a proper hydrolytic rate, and as they are easy to handle, they enable formation of a thin film of uniform film quality.

There are no particular limitations on the aforementioned hydrolysate of zirconium alkoxide. One may cite, for example, hydrolysate of zirconium tetra-normal-butoxide and hydrolysate of zirconium tetrapropoxide. There are no particular limitations on the hydrolytic rate of these hydrolysates, and one within a range from above 0 mol % to 100 mol % may be used.

As these zirconium alkoxides and hydrolysates of zirconium alkoxide are highly hygroscopic, and very unstable, and as the storage stability of this second coating composition is also inferior, it is preferable to use chelate compounds of zirconium alkoxide and chelate compounds of hydrolysate of zirconium alkoxide, which chelatize these zirconium alkoxides and hydrolysates of zirconium alkoxide.

As the aforementioned chelate compounds of zirconium alkoxide, one may cite the reaction products between zirconium alkoxide and one or two or more types of hydrolysis inhibitor selected from the group consisting of ethanolamines such as monoethanolamine, diethanolamine, and triethanolamine; β-diketones such as acetyl acetone; β-keto acid esters such as methyl acetoacetate, ethyl acetoacetate, diethyl malonate, and ethyl phenoxyacetate; and carboxylic acids such as acetic acid, lactic acid, citric acid, benzoic acid, and malic acid. Here, a hydrolysis inhibitor is a compound which forms a chelate compound with zirconium alkoxide, and which has the effect of inhibiting hydrolytic reaction of this chelate compound.

In addition, as chelate compounds of hydrolysate of zirconium alkoxide, one may cite the reaction products between zirconium alkoxide and one or two or more types of hydrolysis inhibitor selected from the group consisting of ethanolamines such as monoethanolamine, diethanolamine, and triethanolamine; β-diketones such as acetyl acetone; β-keto acid esters such as methyl acetoacetate, ethyl acetoacetate, diethyl malonate, and ethyl phenoxyacetate; and carboxylic acids such as acetic acid, lactic acid, citric acid, benzoic acid, and malic acid. The definition of hydrolysis inhibitor is as stated above.

It is preferable that the proportion of this hydrolysis inhibitor relative to zirconium alkoxide or hydrolysate of zirconium alkoxide be 0.5 mol-fold to 4 mol fold, and preferably 1 mol-fold to 3 mol-fold relative to the zirconium (Zr) contained in this zirconium alkoxide or hydrolysate of zirconium alkoxide.

This is because when the proportion is less than 0.5 mol-fold, the stability of the coating composition is insufficient. On the other hand, when it exceeds 4 mol-fold, the hydrolysis inhibitor remains in the thin film even after heat treatment, with the result that hardness of the thin film declines.

With respect to these chelate compounds of zirconium alkoxide and chelate compounds of hydrolysate of zirconium alkoxide, it is sufficient to dissolve zirconium alkoxide or hydrolysate of zirconium alkoxide in a solvent, to further add a hydrolysis inhibitor, and to produce a chelating reaction in the obtained solvent.

As the aforementioned silicon component, there are no particular limitations so long as it is a silicon compound that is capable of becoming silicon oxide by heat treatment. One may cite, for example, colloidal silica, silicon alkoxide, and hydrolysate of silicon alkoxide. With respect to the hydrolytic rate of this hydrolysate, there are no particular limitations, and one may use hydrolysate that is within a range from above 0 mol % to 100 mol %.

As the aforementioned solvent, one may use solvent without any particular limitation so long as it is able to dissolve or disperse the aforementioned zirconium component and silicon component. For example, in addition to water and lower alcohols such as methanol, ethanol, 2-propanol, and 1-butanol, one may cite: ethers (cellosolves) such as ethylene glycol monomethyl ether and ethylene glycol monoethyl ether; ketones such as acetone, dimethylketone, and diethylketone; glycols such as ethylene glycol; higher alcohols; esters, etc. Particularly when water is used as the solvent, it is undesirable to have an amount of water that is at or above the amount of hydrolysis of the alkoxide, as this lowers the stability of the coating composition.

Here, when zirconium alkoxide and/or hydrolysate of zirconium alkoxide is used as the zirconium component, or when silicon alkoxide and/or hydrolysate of silicon alkoxide is used as the silicon component, it is acceptable to add a catalyst that controls the hydrolytic reaction of this zirconium component or silicon component.

As this catalyst, one may cite inorganic acids such as hydrochloric acid and nitric acid, organic acids such as citric acid and acetic acid, etc. As the additive amount of this catalyst, 0.01-10 mass % of the total amount of the zirconium component and silicon component in the coating composition is normally preferable. Excessive addition of catalyst is undesirable, as it risks corroding the heat treatment furnace during heat treatment.

With respect to this point, it is preferable when a chelate compound of zirconium alkoxide or a chelate compound of hydrolysate of zirconium alkoxide is used as the zirconium component, and when colloidal silica is used as the silicon component, because there is no need to add acid as a catalyst that controls the hydrolytic reaction, and accordingly there is no risk of corroding the heat treatment furnace that conducts heat treatment when forming the thin film.

With respect to the total content rate of the zirconium component and the silicon component in this coating composition, when the zirconium component and the silicon component are respectively converted to zirconium oxide ($ZrO_2$) and silicon oxide ($SiO_2$), it is preferable that the total content rate of the zirconium oxide and the silicon oxide be 1 mass % or more and 10 mass % or less.

It is undesirable when the total content rate falls below 0.1 mass %, because it is difficult to form a thin film of the prescribed film thickness. On the other hand, it is undesirable when the total content rate exceeds 10 mass %, because it causes the prescribed film thickness to be exceeded, and the thin film to whiten and peel.

Next, this second coating composition is applied to the surface of the base material 2. There are no particular limitations as to the application method, and one may use the spray method, dipping method, brushing method, etc. With respect to application, it is preferable to prepare the thickness of the coating film so that film thickness after heat treatment is within the range of 0.001 μm to 10 μm.

The coating film obtained in this manner is subjected to heat treatment at a heat treatment temperature of 100° C. or higher, or more preferably at 200° C. or higher, and normally for a heat treatment period of 0.1 hour or more and 24 hours or less, thereby producing the thin film 3.

It is undesirable when the heat treatment temperature falls below 100° C., or when the heat treatment period is insufficient, as the film strength of the obtained thin film 3 is diminished. On the other hand, as there is risk of deformation of the base material 2 when the heat treatment temperature is too high or when the heat treatment period is too long, heat treatment temperature and heat treatment time are to be adjusted according to the qualities of the base material 2. There are no particular limitations on the atmospheric medium during heat treatment, and it is normally conducted in the ambient air.

Next, a phosphorus (P) component is dissolved or dispersed in water or an organic solvent to prepare a solution or dispersion liquid including a phosphorus (P) component.

As this phosphorus (P) component, there are no particular limitations, and it is sufficient if it is a compound which has phosphorus (P) in its molecular skeleton, e.g., phosphoric acids such as phosphoric acid, polyphosphoric acid, and metaphosphoric acid; phosphates such as sodium phosphate and sodium hydrogen phosphate; condensed phosphates such as sodium polyphosphate, sodium metaphosphate, sodium hydrogen polyphosphate, and sodium hydrogen metaphosphate; and phosphoric acid compounds such as phosphoric acid ester.

As the solvent of this solution or dispersion liquid, it is sufficient if the solvent is capable of dissolving or dispersing the phosphorus (P) component. One may cite water and organic solvents, and there are no particular limitations on these organic solvents.

This phosphorus (P) component is dissolved or dispersed in water or an organic solvent. There are no particular limitations on the organic solvents.

With respect to the concentration of phosphorus (P) in the solution or dispersion liquid including this phosphorus (P) component, there are no particular limitations, but 0.01 mass % or more and 10 mass % or less is preferable.

When the concentration of this phosphorus (P) component falls below 0.01 mass %, the anti-stain properties which are the characteristic effects of the present invention are not sufficiently obtained. On the other hand, when the concentration of the phosphorus (P) component exceeds 10 mass %, the surface of the surface layer 3a is coarsened, and there is risk of occurrence of surface roughness.

In order to enhance application properties, one may include surfactants in the solution or dispersion liquid including this phosphorus (P).

The solution or dispersion liquid including this phosphorus (P) component is applied onto the thin film 3.

There are no particular limitations on the application method, and one may apply the spray method, dipping method, brushing method, etc. As for the application amount when this solution or dispersion liquid is applied, there are no particular limitations, so long as the amount enables adequate impartation of anti-stain properties to the thin film 3.

Next, the thin film 3 to which this solution or dispersion liquid including the phosphorus (P) component is applied is subjected to heat treatment for 0.1 hour to 24 hours at a temperature of 100° C. or higher, and preferably 200° C. or higher, whereby the phosphorus (P) component is incorporated into the thin film 3.

Here, this is because when the heat treatment temperature falls below 100° C., or when the heat treatment period is too short, the film strength of the thin film 3 is insufficient, the content of the phosphorus (P) component in the surface layer 3a of the thin film 3 is inadequate, and the anti-staining effects are not attained. On the other hand, as there is risk of deformation of the base material 2 when the heat treatment temperature is too high or when the heat treatment period is too long, heat treatment temperature and heat treatment time are to be adjusted according to the base material 2. There are no particular limitations on the atmospheric medium during heat treatment, and it is normally conducted in the ambient air.

With respect to the heat treatment which incorporates this phosphorus (P) component into the thin film 3, so long as the aforementioned thin film 3 is in a high temperature condition of 100° C. or higher, there is no need to separately conduct another heat treatment process.

Residue may remain after heat treatment, but this can be easily removed by water washing or the like.

As described above, according to the anti-stain product of the present embodiment, it is possible to prevent fixation of burnt-on stains originating in organic matter such as food products, and easily remove these burnt-on stains by water washing even when burnt-on stains have been affixed at high temperatures of 300° C. or more.

According to the manufacturing method of the anti-stain products of the present embodiment, it is possible to conveniently and inexpensively manufacture—without need of special equipment or manufacturing processes—anti-stain products which can prevent fixation of burnt-on stains originating in organic matter such as food products, and which allow easy removal of these burnt-on stains by water washing even when burnt-on stains have become affixed at high temperatures of 300° C. or more.

Third Embodiment

Figure 2:
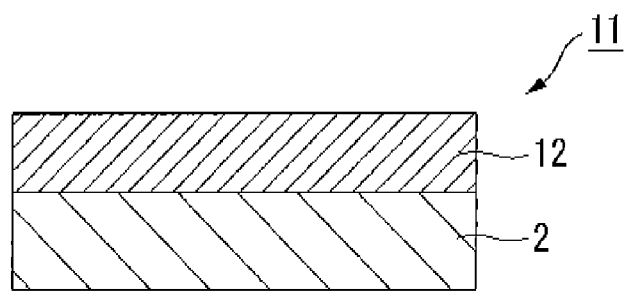
FIG. 2 is a cross-sectional view which shows the anti-stain product of a third embodiment of the present invention.

FIG. 2 is a cross-sectional view which shows the anti-stain product of a third embodiment of the present invention. This anti-stain product 11 differs from the anti-stain product 1 of the second embodiment in that, with respect to the anti-stain product of the second embodiment, a thin film 3 was formed which contained silicon (Si), zirconium (Zr), oxygen (O), and phosphorus (P), and the phosphorus (I) was distributed at least in a surface layer 3a of this thin film 3, whereas in the anti-stain product 11 of the present embodiment, a thin film 12 is formed which contains silicon (Si), zirconium (Zr), oxygen (O), and phosphorus (P) in prescribed proportions, and the phosphorus (P) is uniformly distributed throughout this thin film 12.

The composition of this thin film 12 contains silicon (Si), zirconium (Zr), oxygen (O), and phosphorus (P), and is such that when the silicon (Si) and the zirconium (Zr) are respectively converted to silicon oxide ($SiO_2$) and zirconium oxide ($ZrO_2$), the mass percent of the silicon oxide ($SiO_2$) relative to the total amount of zirconium oxide ($ZrO_2$) and silicon oxide ($SiO_2$) is 50 mass % or less, and preferably 1 mass % or more and 20 mass % or less. The phosphorus (P) is almost uniformly distributed throughout the thin film 12.

The entirety of the thin film 12 that contains this phosphorus (P) has excellent anti-stain functions, and constitutes a thin film with anti-stain properties. Moreover, as this thin film 12 contains silicon oxide ($SiO_2$), it has excellent water resistance and adhesion to the base material 2.

In this instance, the reason why the mass percent of the silicon oxide ($SiO_2$) relative to the total amount of zirconium oxide ($ZrO_2$) and silicon oxide ($SiO_2$) is 50 mass % or less is that when the mass percent of silicon oxide ($SiO_2$) exceeds 50 mass %, it is not possible to prevent fixation of burnt-on stains, and, once affixed, burnt-on stains cannot be removed merely by wiping with a damp cloth.

In particular, it is preferable when the mass percent of silicon oxide ($SiO_2$) is 1 mass % or more and 20 mass % or less, because fixation of burnt-on stains can be still more efficiently prevented, and because even if burnt-on stains become affixed at high temperatures of 300° C. or higher, these burnt-on stains can be still more efficiently and easily removed by water washing.

The concentration of the phosphorus (P) in this thin film 12 is not particularly limited, but 0.001 mass % or more and 10 mass % or less is preferable, 0.01 mass % or more and 10 mass % or less is more preferable, and 0.1 mass % or more and 10 mass % or less is still more preferable.

When the concentration of phosphorus (P) in this thin film 12 falls below 0.001 mass %, burnt-on stains which are burnt on and affixed at high temperatures of 300° C. or more cannot be removed merely by wiping with a damp cloth. On the other hand, it is undesirable when the concentration of phosphorus (P) exceeds 10 mass %, as the water resistance and wear resistance of the thin film 12 diminishes.

It is preferable that the thickness of the thin film 12 be 0.001 μm or more and 10 μm or less.

It is undesirable for the thickness of this thin film 12 to fall below 0.001 μm, as the impartation of anti-stain properties—i.e., anti-stain properties relative to burnt-on stains and ease of removal of burnt-on stains once affixed—is then insufficient. On the other hand, it is undesirable for thickness to exceed 10 μm, because the impact resistance of the thin film 12 itself declines, rendering it prone to cracking.

Particularly in order to prevent the occurrence of interference colors, it is optimal to set the thickness of the thin film 12 at 0.1 μm or less.

The anti-stain product 11 on which is formed this thin film 12 can effectively prevent fixation of burnt-on stains, and enables simple removal merely by wiping with a damp cloth even when burnt-on stains are affixed at high temperatures of 300° C. or more.

In addition, the thin film 12 exhibits excellent durability.

The reason why this thin film 12 demonstrates anti-stain effects is identical to that of the surface layer 3a of the thin film 3 of the second embodiment.

This anti-stain product 11 can be manufactured, for example, by the following third manufacturing method.

That is, this third manufacturing method has a process wherein a third coating composition—which contains a solvent, a silicon (Si) component, a phosphorus (P) component, and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less, and which is such that when the zirconium (Zr) component and the silicon (Si) component are respectively converted to zirconium oxide ($ZrO_2$) and silicon oxide ($SiO_2$), the mass percent of the silicon oxide ($SiO_2$) relative to the total amount of zirconium oxide ($ZrO_2$) and silicon oxide ($SiO_2$) is 50 mass % or less, and preferably 1 mass % or more and 20 mass % or less—is applied to the surface of the base material 2 to form a coating film, after which this coating film is subjected to heat treatment at a temperature of 100° C. or higher.

With respect to the concentration of the phosphorus (P) component in this third coating composition, there are no particular limitations, but it is preferable that when the zirconium (Zr) component and the silicon (Si) component are respectively converted to zirconium oxide ($ZrO_2$) and silicon oxide ($SiO_2$), the mass percent of the phosphorus (P) relative to the total amount of zirconium oxide ($ZrO_2$) and silicon oxide ($SiO_2$) be 0.001 mass % or more and 10 mass % or less, because the obtained thin film 12 has excellent anti-stain properties, because prevention of fixation of burnt-on stains can be still more efficiently prevented, and because even if burnt-on stains become affixed at high temperatures of 300° C. or higher, these burnt-on stains can be still more efficiently and easily removed by water washing.

The zirconium alkoxide, hydrolysate of zirconium alkoxide, chelate compounds of zirconium alkoxide, chelate compounds of hydrolysate of zirconium alkoxide, hydrolysis inhibitor, silicon component, solvent, catalyst, and phosphorus (P) component pertaining to this third coating composition are identical to the respective components in the second coating composition of the second embodiment.

As to the method of application of this third coating composition onto the base material 2, there are no particular limitations, and the spray method, dipping method, brushing method, etc. may be applied.

Next, the base material 2 onto which this third coating composition is applied is subjected to heat treatment at a temperature of 100° C. or higher, or preferably 200° C. or higher, and for a period from 0.1 hour to 24 hours, thereby forming the thin film 12 on the base material 2.

Here, this is because when the heat treatment temperature falls below 100° C., or when the heat treatment period is too short, the film strength of the thin film 12 is insufficient. On the other hand, as there is risk of deformation of the base material 2 when the heat treatment temperature is too high or when the heat treatment period is too long, heat treatment temperature and heat treatment time are to be adjusted according to the base material 2. There are no particular limitations on the atmospheric medium during heat treatment, and it is normally conducted in the ambient air.

There may be residue remaining after heat treatment, but this can be easily removed by water washing or the like.

This anti-stain product 11 can also be manufactured by the second manufacturing method of the second embodiment. That is, at the time of heat treatment in the "second process" of the aforementioned second manufacturing method, a solution or dispersion liquid that includes the phosphorus (P) component is made to fully permeate the thin film to the depths (bottom part) thereof, and heat treatment is performed, whereby a chemical reaction with the phosphorus (P) is engendered in the depths of the thin film.

In the present embodiment, as well, the same effects as those of the second embodiment can be achieved.

In addition, as the phosphorus (P) is almost uniformly distributed in the thin film 12, in-plane uniformity of anti-stain properties in the surface of the anti-stain product 11 is enhanced.

Fourth Embodiment

Figure 3:
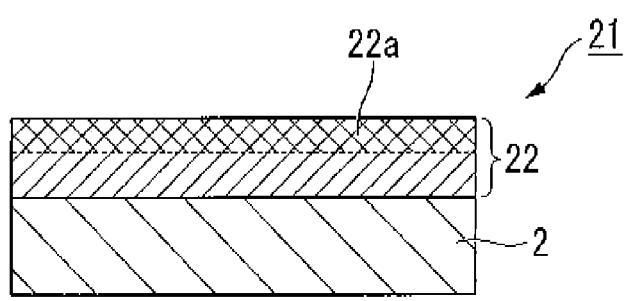
FIG. 3 is a cross-sectional view which shows the anti-stain product of a fourth embodiment of the present invention.

FIG. 3 is a cross-sectional view which shows the anti-stain product of a fourth embodiment of the present invention. This anti-stain product 21 differs from the anti-stain product 1 of the second embodiment in that in the anti-stain product 1 of the second embodiment, a thin film 3 was formed which contained silicon (Si), zirconium (Zr), oxygen (O), and phosphorus (P), and the phosphorus (P) was distributed at least in the surface layer 3a of this thin film 3, whereas in the anti-stain product 21 of the present embodiment, a thin film 22 is formed which contains zirconium (Zr), oxygen (O), and phosphorus (P), and the phosphorus (P) is distributed at least in a surface layer 22a of this thin film 22.

It is preferable that the thickness of the thin film 22 be 0.001 μm or more and 10 μm or less.

It is undesirable for the thickness of this thin film 22 to fall below 0.001 μm, as the impartation of anti-stain properties— i.e., anti-stain properties relative to burnt-on stains and ease of removal of burnt-on stains once affixed—is then insufficient. On the other hand, it is undesirable for thickness to exceed 10 μm, because the impact resistance of the thin film 22 itself declines, rendering it prone to cracking.

Particularly in order to prevent the occurrence of interference colors, it is optimal to set the thickness of the thin film 22 at 0.1 μm or less.

The thickness of this surface layer 22a is determined by the heat treatment conditions in the below-mentioned "second process" of a fourth manufacturing method, but under normal heat treatment conditions, it would be at least 0.0001 μm or more from the surface of the thin film 22, and preferably 0.005 μm or more. The concentration of the phosphorus (P) in this surface layer 22a is not particularly limited, but is 0.001 mass % or more and 10 mass % or less, and preferably 0.1 mass % or more and 10 mass % or less, and has a concentration gradient such that concentration gradually decreases in the depthwise direction from the surface of this thin film 22.

When the concentration of phosphorus (P) in this surface layer 22a falls below 0.001 mass %, burnt-on stains which are burnt on and affixed at high temperatures of 300° C. or more cannot be removed merely by wiping with a damp cloth. On the other hand, it is undesirable when the concentration of phosphorus (P) in the surface layer 22a exceeds 10 mass %, as the water resistance and wear resistance of the thin film 22 diminishes.

The anti-stain product 21 on which is formed the thin film 22 having this type of surface layer 22a can effectively prevent fixation of burnt-on stains, and enables simple removal merely by wiping with a damp cloth even when burnt-on stains are burnt on at high temperatures of 300° C. or more.

In addition, the thin film 22 having this surface layer 22a exhibits excellent durability.

The reason why this surface layer 22a demonstrates anti-stain effects is thought to be closely related to the bonding state of the oxygen (O) atoms with the respective atoms of zirconium (Zr) and phosphorus (P) which are constituent components of the surface layer 22a.

That is, as shown in the below structural formula (6), one zirconium (Zr) atom chemically bonds with three oxygen (O) atoms, and one of these oxygen (O) atoms undergoes double bonding, while the other oxygen (O) atoms each have a single bonding extremity.

(Formula 6)

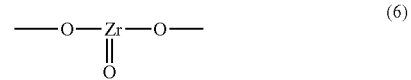

Portions of the bonding extremities of these oxygen (O) atoms bond with hydrogen to constitute hydroxyl groups (—OH), and exhibit hydrophilicity. When the surface layer 22a of the thin film 22 exhibits hydrophilicity, burnt-on stains are more firmly affixed in the case where hydrophilic organic substances typified by proteins and the like sustain thermal effects and are burnt on.

When phosphorus (P) is included in a thin film 22 which has such chemical bonding of zirconium (Zr) atoms and oxygen (O) atoms, as shown in the below structural formula (7), the phosphorus (P) crosslinks with the bonding extremities of the oxygen (O) atoms by dehydration-condensation reaction, and double bonding also occurs. As these double bonds are not hydroxyl groups (—OH), they exhibit a certain degree of water repellency.

(Formula 7)

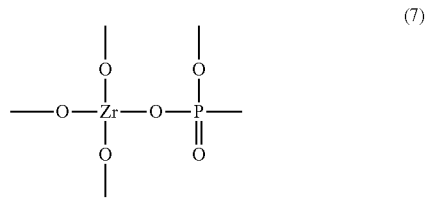

As a result, the surface layer 22a of the thin film 22 is provided with the proper degree of hydrophilicity and water repellency relative to burnt-on stains. Consequently, the adhesion of burnt-on stains to the base material 2 is lowered, fixation of burnt-on stains is effectively prevented, and simple removal merely by wiping with a damp cloth is possible even if burnt-on stains are burnt on at high temperatures of 300° C. or higher.

This anti-stain product 21 can be manufactured, for example, by the following fourth manufacturing method.

That is, the fourth manufacturing method has: a first process wherein a fourth coating composition—which contains a solvent and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less—is applied to the surface of the base material 2 to form a coating film, after which this coating film is subjected to heat treatment at a temperature of 100° C. or higher to produce a thin film; followed by a second process wherein a solution or dispersion liquid including a phosphorus (P) component is applied onto this thin film, and the phosphorus (P) component is incorporated into the thin film by conducting heat treatment at a temperature of 100° C. or higher, and preferably 200° C. or higher.

The zirconium alkoxide, hydrolysate of zirconium alkoxide, chelate compounds of zirconium alkoxide, chelate compounds of hydrolysate of zirconium alkoxide, hydrolysis inhibitor, silicon component, solvent, and catalyst pertaining to this fourth coating composition are identical to the respective components in the second coating composition of the second embodiment.

As to the method of application of this fourth coating composition onto the base material 2, there are no particular limitations, and the spray method, dipping method, brushing method, etc. may be applied.

Next, the base material 2 onto which this fourth coating composition is applied is subjected to heat treatment at a temperature of 100° C. or higher, or preferably 200° C. or higher, and for a period from 0.1 hour to 24 hours, thereby forming the thin film 22 on the base material 2.

Here, when the heat treatment temperature falls below 100° C., or when the heat treatment period is inadequate, the film strength of the thin film 22 is insufficient. On the other hand, as there is risk of deformation of the base material 2 when the heat treatment temperature is too high or when the heat treatment period is too long, heat treatment temperature and heat treatment time are to be adjusted according to the base material 2. There are no particular limitations on the atmospheric medium during heat treatment, and it is normally conducted in the ambient air.

Next, a solution or dispersion liquid including a phosphorus (P) component is applied onto this thin film 22. This solution or dispersion liquid including a phosphorus (P) component is identical to the solution or dispersion liquid including a phosphorus (P) component of the second embodiment.

As to the application method for applying this solution or dispersion liquid including a phosphorus (P) component onto the thin film 22, there are no particular limitations, and the spray method, dipping method, brushing method, etc. may be applied.

Next, the thin film 22 to which this solution or dispersion liquid including the phosphorus (P) component is applied is subjected to heat treatment for 0.1 hour to 24 hours at a temperature of 100° C. or higher, and preferably 200° C. or higher, whereby the phosphorus (P) component is incorporated into the thin film 22.

Here, this is because when the heat treatment temperature falls below 100° C., or when the heat treatment period is too short, the film strength of the thin film 22 is insufficient, the content of the phosphorus (P) component in the surface layer 22a of the thin film 22 is inadequate, and the anti-staining effects are not attained. On the other hand, as there is risk of deformation of the base material 2 when the heat treatment temperature is too high or when the heat treatment period is too long, heat treatment temperature and heat treatment time are to be adjusted according to the base material 2. There are no particular limitations on the atmospheric medium during heat treatment, and it is normally conducted in the ambient air.

With respect to the heat treatment which incorporates this phosphorus (P) component in the thin film 22, so long as the aforementioned thin film 22 is in a high temperature condition of 100° C. or higher, there is no need to separately conduct another heat treatment process.

Residue may remain after heat treatment, but this can be easily removed by water washing or the like.

Even in the present embodiment, it is possible to achieve the same effects as the second embodiment.

Fifth Embodiment

Figure 4:
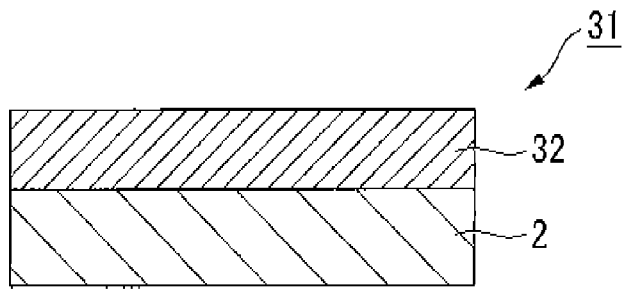
FIG. 4 is a cross-sectional view which shows the anti-stain product of a fifth embodiment of the present invention.

FIG. 4 is a cross-sectional view which shows the anti-stain product of a fifth embodiment of the present invention. This anti-stain product 31 differs from the anti-stain product 11 of the third embodiment in that in the anti-stain product 11 of the third embodiment, a thin film 12 was formed which contained silicon (Si), zirconium (Zr), oxygen (O), and phosphorus (P) in prescribed proportions, and the phosphorus (P) was distributed almost uniformly in this thin film 12, whereas in the anti-stain product 31 of the present embodiment, a thin film 32 is formed which contains zirconium (Zr), oxygen (O), and phosphorus (P) in prescribed proportions, and the phosphorus (P) is distributed almost uniformly in this thin film 32.

The entirety of this thin film 32 including the phosphorus (P) is provided with excellent anti-stain functions, and constitutes a thin film with anti-stain properties.

The concentration of the phosphorus (P) in this thin film 32 is not particularly limited, but 0.001 mass % or more and 10 mass % or less is preferable, and 0.1 mass % or more and 10 mass % or less is more preferable.

When the concentration of phosphorus (P) in this thin film 32 falls below 0.001 mass %, burnt-on stains which are burnt on and affixed at high temperatures of 300° C. or more cannot be removed merely by wiping with a damp cloth. On the other hand, it is undesirable when the concentration of phosphorus (P) exceeds 10 mass %, as the water resistance and wear resistance of the thin film 32 diminishes.

It is preferable that the thickness of the thin film 32 be 0.001 μm or more and 10 μm or less.

It is undesirable for the thickness of this thin film 32 to fall below 0.001 μm, as the impartation of anti-stain properties—i.e., anti-stain properties relative to burnt-on stains and ease of removal of burnt-on stains once affixed—is then insufficient. On the other hand, it is undesirable for thickness to exceed 10 μm, because the impact resistance of the thin film 32 itself declines, rendering it prone to cracking.

Particularly in order to prevent the occurrence of interference colors, it is optimal to set the thickness of the thin film 32 at 0.1 μm or less.

The anti-stain product 31 on which is fowled this thin film 32 can effectively prevent fixation of burnt-on stains, and enables simple removal merely by wiping with a damp cloth even if burnt-on stains are burnt on and affixed at high temperatures of 300° C. or more.

In addition, the thin film 32 exhibits excellent durability.

The reason why this thin film 32 demonstrates anti-stain effects is identical to the reason that applies to the thin film 22 of the fourth embodiment.

This anti-stain product 31 can be manufactured, for example, by the following fifth manufacturing method.

That is, this fifth manufacturing method has a process wherein a fifth coating composition—which contains a solvent, a phosphorus (P) component, and one or two or more types of zirconium (Zr) component selected from the group consisting of zirconium alkoxide, hydrolysate of zirconium alkoxide, a chelate compound of zirconium alkoxide, a chelate compound of hydrolysate of zirconium alkoxide, and zirconium oxide having an average particle diameter of 20 nm or less—is applied to the surface of the base material 2 to form a coating film, after which this coating film is subjected to heat treatment at a temperature of 100° C. or higher.

With respect to the concentration of the phosphorus (P) component in this fifth coating composition, there are no particular limitations, but it is preferable that when the phosphorus (P) component and the zirconium component are respectively converted to phosphorus (P) and zirconium oxide ($ZrO_2$), the mass percent of the phosphorus (P) relative to the zirconium oxide ($ZrO_2$) be 0.001 mass % or more and 10 mass % or less, because the obtained thin film 32 has excellent anti-stain properties, because prevention of fixation of burnt-on stains can be still more efficiently prevented, and because even if burnt-on stains become affixed at high temperatures of 300° C. or higher, these burnt-on stains can be still more efficiently and easily removed by water washing.

The zirconium, alkoxide, hydrolysate of zirconium alkoxide, chelate compounds of zirconium alkoxide, chelate compounds of hydrolysate of zirconium alkoxide, hydrolysis inhibitor, solvent, catalyst, and phosphorus (P) component pertaining to this fifth coating composition are identical to the respective components in the second coating composition of the second embodiment.

As to the method of application of this fifth coating composition onto the base material 2, there are no particular limitations, and the spray method, dipping method, brushing method, etc. may be applied.

Next, the base material 2 onto which this fifth coating composition is applied is subjected to heat treatment at a temperature of 100° C. or higher, or preferably 200° C. or higher, and for a period from 0.1 hour to 24 hours, thereby forming the thin film 32 on the base material 2.

Here, this because when the heat treatment temperature falls below 100° C., or when the heat treatment period is too short, the film strength of the thin film 32 is insufficient. On the other hand, as there is risk of deformation of the base material 2 when the heat treatment temperature is too high or when the heat treatment period is too long, heat treatment temperature and heat treatment time are to be adjusted according to the base material 2. There are no particular limitations on the atmospheric medium during heat treatment, and it is normally conducted in the ambient air.

There may be residue remaining after heat treatment, but this can be easily removed by water washing or the like.

This anti-stain product 31 can also be manufactured by the fourth manufacturing method of the fourth embodiment. That is, at the time of heat treatment in the "second process" of the aforementioned fourth manufacturing method, a solution or dispersion liquid that includes the phosphorus (P) component is made to fully permeate the thin film to the depths (bottom part) thereof, and heat treatment is performed, whereby a chemical reaction with the phosphorus (P) is engendered in the depths of the thin film.

In the present embodiment, as well, the same effects as those of the third embodiment can be achieved.

In the first to fifth embodiments of the present invention, when a coating composition is applied onto a base material using a printing method, and when film formation is conducted so that film thickness after heat treatment is an approximately uniform thickness within a range of 50 nm to 500 nm, the thin film can be colored to a single color tone of one's choice according to the thickness of the thin film. For example, transparency is obtained when the thickness of the thin film is 10-60 nm, a silver color at 60-90 nm, a golden color at 90-150 nm, blue at 190-240 nm, green at 240-280 nm, yellow at 280-320 nm, and iridescence at higher thicknesses. As the aforementioned printing method, there are no particular limitations so long as it is a printing method that enables application at approximately uniform thickness. For example, there is the ink-jet printing method and the screen printing method. Moreover, coloration becomes vivid upon addition in small amounts of a titanium component such as titanium alkoxide, a hafnium component such as hafnium alkoxide, or a yttrium component such as yttrium alkoxide.

In addition, in the first to fifth embodiments of the present invention, there are no particular limitations on the zirconium alkoxide fine particles having an average particle diameter of 20 nm or less, but particles with an average particle diameter of 10 nm or less are preferable as they enable easy formation of thin film having excellent mechanical properties by heat treatment at relatively low temperatures of 100° C.-300° C.

Such zirconium alkoxide fine particles can be inexpensively manufactured in large quantities by, for example, the manufacturing method recorded in Japanese Unexamined Patent Application, First Publication No. 2006-016236, and are marketed by Sumitomo-Osaka Cement Co., Ltd.

EXAMPLES

Below, the present invention is concretely described by Examples and Comparative Examples, but the present invention is not limited by these Examples.

Example 1

Six weight parts of zirconium tetrabutoxide, 3 weight parts of ethyl acetoacetate, and 90.9 weight parts of 2-propanol were mixed for 30 minutes at room temperature (25° C.), and a chelate compound of zirconium tetrabutoxide and ethyl acetoacetate was produced. Next, 0.1 weight parts of tetramethoxysilane were added to this solution to obtain the coating composition.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 2 weight %.

Next, this coating composition was applied by spray onto a stove baking sheet made of crystallized glass (a so-called "glass top") so that the application amount (solid content conversion) was 3 g/m². This was subjected to heat treatment for 20 minutes at 500° C. in the ambient air, and a thin film was formed on the stove baking sheet to obtain the cooking device of Example 1.

The thickness of this thin film was 1 μm, and the surface of the stove baking sheet exhibited surface beauty, with increased luster compared to before the thin film was formed.

Next, the anti-stain properties (ease of removal of burnt-on food stains and oil stains) and water resistance of this cooking device were evaluated. The evaluation results are shown in Table 1.

The evaluation items and evaluation methods were as follows.

Ease of Removal of Burnt-on Stains 10 ml of soy sauce were instilled onto the surface of the cooking device (the stove baking sheet made of crystallized glass), and heated for 1 hour at 300° C. in the ambient air, and the soy sauce was burnt on. Next, this burnt-on adhesion was wiped with a damp cloth using a cloth soaked in water, and ease of removal was evaluated.

(2) Ease of Removal of Oil Stains

One ml of waste cooking oil was instilled onto the surface of the cooking device (the stove baking sheet made of crystallized glass), and ease of removal was evaluated by wiping this waste cooking oil with a damp cloth using a piece of cloth soaked in water, and checking "residual stickiness" by fingertip.

(3) Water Resistance

After immersing the cooking device (the konro baking sheet made of crystallized glass) for 24 hours in boiling water obtained by boiling tap water, the thin film was rubbed by fingertip to evaluate the peeling condition of the thin film.

Example 2

The coating composition of Example 2 was obtained in conformity with Example 1, except that 2-propanol was changed to 90.4 weight parts, and tetramethoxysilane was changed to 0.6 weight parts.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 10 weight %.

Next, using this coating composition, the cooking device of Example 2 was obtained in conformity with Example 1.

The thickness of this thin film was 1 μm, and the surface of the konro baking sheet exhibited surface beauty, with increased luster compared to before the thin film was formed.

The anti-stain properties (ease of removal of burnt-on food stains and oil stains) and water resistance of the cooking device of this Example 2 were evaluated in conformity with Example 1. The evaluation results are shown in Table 1.

Example 3

The coating composition of Example 3 was obtained in conformity with Example 1, except that 2-propanol was changed to 89.9 weight parts, and tetramethoxysilane was changed to 1.1 weight parts.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 18 weight %.

Next, using this coating composition, the cooking device of Example 3 was obtained in conformity with Example 1.

The thickness of this thin film was 1 and the surface of the stove baking sheet exhibited surface beauty, with increased luster compared to before the thin film was formed.

The anti-stain properties (ease of removal of burnt-on food stains and oil stains) and water resistance of the cooking device of this Example 3 were evaluated in conformity with Example 1. The evaluation results are shown in Table 1.

The coating composition of Example 4 was obtained in conformity with Example 1, except that zirconium tetrabutoxide was changed to 2.3 weight parts, ethyl acetoacetate was changed to 1.2 weight parts, 2-propanol was changed to 96.0 weight parts, and tetramethoxysilane was changed to 0.5 weight parts.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 25 weight %.

Next, using this coating composition, the cooking device of Example 4 was obtained in conformity with Example 1.

The thickness of this thin film was 1 μm and the surface of the stove baking sheet exhibited surface beauty, with increased luster compared to before the thin film was formed.

The anti-stain properties (ease of removal of burnt-on food stains and oil stains) and water resistance of the cooking device of this Example 4 were evaluated in conformity with Example 1. The evaluation results are shown in Table 1.

Example 5

The coating composition of Example 5 was obtained in conformity with Example 1, except that zirconium tetrabutoxide was changed to 2.0 weight parts, ethyl acetoacetate was changed to 1.0 weight parts, 2-propanol was changed to 96.3 weight parts, and tetramethoxysilane was changed to 0.7 weight parts.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 35 weight %.

Next, using this coating composition, the cooking device of Example 5 was obtained in conformity with Example 1.

The thickness of this thin film was 1 μm, and the surface of the stove baking sheet exhibited surface beauty, with increased luster compared to before the thin film was formed.

The anti-stain properties (ease of removal of burnt-on food stains and oil stains) and water resistance of the cooking device of this Example 5 were evaluated in conformity with Example 1. The evaluation results are shown in Table 1.

Example 6

Zirconium oxide fine particles with an average particle diameter of 5 nm were dispersed in 2-propanol, and 0.4 weight parts of tetramethoxysilane were added to 99.6 weight parts of the dispersion liquid having a concentration of 1.8 weight % to obtain the coating composition. In this coating composition, when the aforementioned silicon component was converted to silicon oxide ($SiO_2$), the weight percent of the silicon oxide ($SiO_2$) relative to the total amount of the aforementioned zirconium oxide ($ZrO_2$) and the aforementioned silicon oxide ($SiO_2$) was 10 weight %.

Using this coating composition, the cooking device of Example 6 was obtained in conformity with Example 1, except that the application amount was set at 0.5 g/m² in terms of solid content conversion. The thickness of the thin film was 0.1 μm.

The anti-stain properties (ease of removal of burnt-on food stains and oil stains) and water resistance of the cooking device of this Example 6 were evaluated in conformity with Example 1. The evaluation results are shown in Table 1.

Comparative Example 1

The coating composition was obtained by mixing 6 weight parts of zirconium tetrabutoxide, 93 weight parts of 2-propanol, and 1 weight part of 60 weight % nitric acid.

Next, using this coating composition, the cooking device of Comparative Example 1 was obtained in conformity with Example 1.

The thickness of this thin film was 1 μm.

The anti-stain properties (ease of removal of burnt-on food stains and oil stains) and water resistance of the cooking device of this Comparative Example 1 were evaluated in conformity with Example 1. The evaluation results are shown in Table 1.

Comparative Example 2

The coating composition of Comparative Example 2 was obtained in conformity with Example 1, except that zirconium tetrabutoxide was changed to 1.7 weight parts, ethyl acetoacetate was changed to 0.8 weight parts, 2-propanol was changed to 96.6 weight parts, and tetramethoxysilane was changed to 0.9 weight parts.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 45 weight %.

Next, using this coating composition, the cooking device of Comparative Example 2 was obtained in conformity with Example 1.

The thickness of this thin film was 1 μm.

The anti-stain properties (ease of removal of burnt-on food stains and oil stains) and water resistance of the cooking device of this Comparative Example 2 were evaluated in conformity with Example 1, The evaluation results are shown in Table 1.

According to Table 1, in Examples 1-3, the ease of removal of burnt-on food stains was particularly excellent, while the ease of removal of oil stains and the water resistance of the thin film were also satisfactory.

In Examples 4-5, the ease of removal of oil stains was particularly excellent, while the ease of removal of burnt-on food stains and the water resistance of the thin film were also satisfactory.

In contrast to this, in Comparative Example 1, although the ease of removal of burnt-on food stains was satisfactory, the ease of removal of oil stains and the water resistance of the thin film were both poor. In Comparative Example 2, although the ease of removal of oil stains and the water resistance of the thin film were excellent, the ease of removal of burnt-on food stains was poor.

Accordingly, it was found that a composition wherein the amount of $SiO_2$ in the thin film was in a range of 50 weight % or less, and preferably from 1 weight % to 40 weight %, was satisfactory in all cases with respect to ease of removal of burnt-on food stains, ease of removal of oil stains, and water resistance of the thin film Example 7

10 weight parts of zirconium tetrabutoxide, 5 weight parts of acetylacetone, and 84.5 weight parts of 2-propanol were mixed, and a chelate compound of zirconium tetrabutoxide and acetylacetone was produced. Next, 0.5 weight parts of tetramethoxysilane were added to this solution to obtain the coating composition.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 7.2 weight %.

Next, this coating composition was applied by spray onto a stove baking sheet made of crystallized glass so that the application amount (solid content conversion) was 1.5 g/m². This was subjected to heat treatment for 10 minutes at 600° C.

TABLE 1

| | Amount (weight %) of $SiO_2$ in thin film | Amount (weight %) of $ZrO_2$ in thin film | Ease of removal of burnt-on stains | Ease of removal of oil stains | Water resistance |
|---|---|---|---|---|---|
| Example 1 | 2 | 98 | Very good | Good | Good |
| Example 2 | 10 | 90 | Very good | Good | Good |
| Example 3 | 18 | 82 | Very good | Good | Good |
| Example 4 | 25 | 75 | Good | Very good | Very good |
| Example 5 | 35 | 65 | Good | Very good | Very good |
| Example 6 | 10 | 90 (zirconium oxide fine particles were used) | Very good | Good | Good |
| Comparative Example 1 | 0 | 100 | Good | Poor | Poor |
| Comparative Example 2 | 45 | 55 | Poor | Very good | Very good | in an ambient air atmosphere, and a thin film was formed on the stove baking sheet to obtain the cooking device of Example 7.

The thickness of this thin film was 0.5 μm, and the surface of the stove baking sheet exhibited surface beauty, with increased luster compared to before the thin film was formed.

Example 8

The coating composition was obtained by mixing 15 weight parts of zirconium tetra-acetylacetonate, 0.5 weight parts of a 2-propanol dispersion liquid containing colloidal silica of 30 weight %, and 84.5 weight parts of butyl-β-oxyethylether (butyl cellosolve).

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 4 weight %.

Next, this coating composition was applied by spray onto an oven dish made of enamel so that the application amount (solid content conversion) was 0.3 g/m². This was subjected to heat treatment for 30 minutes at 500° C. in an ambient air atmosphere, and a thin film was formed on the oven dish to obtain the cooking device of Example 8.

The thickness of this thin film was 0.1 μm, and the surface of the enamel oven dish exhibited surface beauty, with increased luster compared to before the thin film was formed.

Example 9

10 weight parts of zirconium tetrabutoxide, 5 weight parts of acetylacetone, and 84 weight parts of 2-propanol were mixed, and a chelate compound of zirconium tetrabutoxide and acetylacetone was produced. Next, 1 weight part of tetraethoxysilane was added to this solution to obtain the coating composition.

In this coating composition, when the zirconium component and the silicon component were respectively converted to zirconium oxide ($ZrO_2$) and silicon oxide ($SiO_2$), the weight percent of the silicon oxide ($SiO_2$) relative to the total amount of zirconium oxide ($ZrO_2$) and silicon oxide ($SiO_2$) was 8.6 weight %.

Next, this coating composition was applied by dipping onto a ceramic meat-grilling plate so that the application amount (solid content conversion) was 1.5 g/m². This was subjected to heat treatment for 50 minutes at 700° C. in an ambient air atmosphere, and a thin film was formed on this meat-grilling plate to obtain the cooking device of Example 9.

The thickness of this thin film was 0.5 μm, and the surface of the meat-grilling plate exhibited surface beauty, with increased luster compared to before the thin film was formed.

Egg whites were daubed onto the surfaces of the respective cooking device of Examples 7-9, and were burnt on by conducting heat treatment for one hour at 350° C. in an ambient air atmosphere. When these burnt-on adhesions were wiped with a damp cloth using a cloth that had been soaked in water, they were able to be wiped off easily.

In addition, waste cooking oil was instilled onto the surfaces of the respective cooking device of Examples 7-9. When this waste cooking oil was wiped with a damp cloth using a piece of cloth that had been soaked in water, it was able to be wiped off easily.

In the Examples and Comparative Examples which follow, a baking sheet for a stove is used as the anti-stain product.

Example 10

6 mass parts of zirconium tetrabutoxide, 3 mass parts of ethyl acetoacetate, and 90.9 mass parts of 2-propanol were mixed for 30 minutes at room temperature (25° C.), and a chelate compound of zirconium tetrabutoxide and ethyl acetoacetate was produced. Next, 0.1 mass part of tetramethoxysilane was added to this solution, the obtained solution was diluted 10-fold with ethylene glycol monobutylether (butyl cellosolve), and the coating composition of Example 10 was obtained.

In this coating composition, when the zirconium component and the silicon component were respectively converted to zirconium oxide ($ZrO_2$) and silicon oxide ($SiO_2$), the mass percent of the silicon oxide ($SiO_2$) relative to the total amount of zirconium oxide ($ZrO_2$) and silicon oxide ($SiO_2$) was 2 mass %.

Next, this coating composition was applied by spraying onto a stove baking sheet made of crystallized glass with an application amount of 100 g/m². This was subjected to heat treatment and baking for 20 minutes at 500° C. in an ambient air atmosphere, and a thin film was formed on the stove baking sheet. The thickness of this thin film was 0.1 μm.

Next, this stove baking sheet was immersed in a sodium tripolyphosphate aqueous solution of 1 mass % (P conversion), and the surface of the thin film was fully soaked, after which it was withdrawn, and this stove baking sheet was further subjected to heat treatment for 20 minutes at 250° C. in an ambient air atmosphere. Next, it was washed with water to remove residue on the thin film, and the stove baking sheet of Example 10 was obtained.

When the phosphorus (P) content rate in the surface of the thin film of this stove baking sheet was measured using an electronic probe micro-analyzer (EPMA), it was 0.1 mass %.

The anti-stain properties of the stove baking sheet of this Example 10 were evaluated for "ease of removal of burnt-on stains." The evaluation method was as follows.

(Ease of Removal of Burnt-on Stains)

One mL of soy sauce was instilled onto the surface of the thin film, after which it was burnt on under the respective conditions of: (1) one hour at 250° C., in an ambient air atmosphere; (2) one hour at 350° C., in an ambient air atmosphere. Next, this burnt-on adhesion was wiped with a damp cloth using a piece of cloth that had been Soaked in water, and ease of removal was evaluated. The evaluation results are shown in Table 1. The "impregnation" in Table 1 indicates what results from the second manufacturing method.

Example 11

The coating composition of Example 11 was obtained in conformity with Example 10, except that zirconium tetrabutoxide was changed to 1.7 mass parts, ethyl acetoacetate was changed to 0.8 mass parts, 2-propanol was changed to 96.6 mass parts, and tetramethoxysilane was changed to 0.9 mass parts.

In the coating composition of this Example 11, when the zirconium component and the silicon component were respectively converted to zirconium oxide ($ZrO_2$) and silicon oxide ($SiO_2$), the mass percent of the silicon oxide ($SiO_2$) relative to the total amount of zirconium oxide ($ZrO_2$) and silicon oxide ($SiO_2$) was 45 mass %.

Next, the stove baking sheet of Example 11 was obtained in conformity with Example 10, except that the coating composition of this Example 11 was used. The thickness of this thin film was 0.1 μm.

When the phosphorus (P) content rate in the surface of the thin film of the stove baking sheet of this Example 11 was measured using an electronic probe micro-analyzer (EPMA), it was 0.1 mass %.

Furthermore, the anti-stain properties of the stove baking sheet of this Example 11 were evaluated in conformity with Example 11. The evaluation results are shown in Table 1.

Example 12

6 mass parts of zirconium tetrabutoxide, 3 mass parts of ethyl acetoacetate, and 91 mass parts of 2-propanol were mixed for 30 minutes at room temperature (25° C.), and a chelate compound of zirconium tetrabutoxide and ethyl acetoacetate was produced. Next, this solution was diluted 10-fold with ethylene glycol monobutylether (butyl cellosolve), and the coating composition of Example 12 was obtained.

Next, the stove baking sheet of Example 12 was obtained in conformity with Example 10, except that the coating composition of this Example 12 was used. The thickness of this thin film was 0.1 μm.

When the phosphorus (P) content rate in the surface of the thin film of the stove baking sheet of this Example 12 was measured using an electronic probe micro-analyzer (EPMA), it was 0.1 mass %.

Furthermore, the anti-stain properties of the stove baking sheet of this Example 12 were evaluated in conformity with Example 10. The evaluation results are shown in Table 1. The "impregnation" in Table 1 indicates what results from the fourth manufacturing method.

Example 13

The coating composition of Example 13 was obtained by adding trimethyl phosphate to the coating composition of Example 10 as a phosphorus (P) component. However, the additive amount of the phosphorus (P) component was set such that when the trimethyl phosphate, the zirconium component, and the silicon component were respectively converted to phosphorus (P), zirconium oxide ($ZrO_2$), and silicon oxide, ($SiO_2$), the mass percent of the phosphorus (P) relative to the total amount of zirconium oxide ($ZrO_2$) and silicon oxide ($SiO_2$) was 1 mass %.

Next, the stove baking sheet of Example 13 was obtained in conformity with Example 10, except that the coating composition of this Example 13 was used. However, as trimethyl phosphate had been added in advance to the coating composition of Example 13 as a phosphorus (P) component, tripolyphosphoric acid treatment was not conducted. The thickness of this thin film was 0.1 μm.

When the phosphorus (P) content rate in the surface of the thin film of the stove baking sheet of this Example 13 was measured using are electronic probe micro-analyzer (EPMA), it was 1 mass %.

Furthermore, the anti-stain properties of the stove baking sheet of this Example 13 were evaluated in conformity with Example 10. The evaluation results are shown in Table 1. The "application" in Table 1 indicates what results from the third manufacturing method.

Example 14

The coating composition of Example 14 was obtained by adding trimethyl phosphate to the coating composition of Example 12 as a phosphorus (P) component. However, the additive amount of the phosphorus (P) component was set such that when the trimethyl phosphate and the zirconium component were respectively converted to phosphorus (P) and zirconium oxide ($ZrO_2$), the mass percent of the phosphorus (P) relative to the zirconium oxide ($ZrO_2$) was 1 mass %.

Next, the stove baking sheet of Example 14 was obtained in conformity with Example 12, except that the coating composition of this Example 14 was used. However, as trimethyl phosphate had been added in advance to the coating composition of Example 14 as a phosphorus (P) component, tripolyphosphoric acid treatment was not conducted. The thickness of this thin film was 0.1 μm.

When the phosphorus (P) content rate in the surface of the thin film of the stove baking sheet of this Example 14 was measured using an electronic probe micro-analyzer (EPMA), it was 1 mass %.

Furthermore, the anti-stain properties of the stove baking sheet of this Example 14 were evaluated in conformity with Example 10. The evaluation results are shown in Table 1. The "application" in Table 1 indicates what results from the fifth manufacturing method.

Example 15

A dispersion liquid in which zirconium oxide fine particles with an average particle diameter of 5 nm were dispersed in water (concentration: 5 mass %) was applied by spray in an application amount of 0.5 g/m² in terms of solid content conversion onto a stove baking sheet made of enamel. This was subjected to heat treatment and baking for 30 minutes at 250° C. in an ambient air atmosphere, and a thin film was formed on the stove baking sheet. The thickness of this thin film was 0.1 μm.

Next, an aqueous solution of sodium tripolyphosphate of 1 mass % (P) conversion was applied by spray onto this stove baking sheet, which was again subjected to heat treatment for 30 minutes at 250° C. in an ambient air atmosphere. Residue on the thin film was removed by water washing to obtain the stove baking sheet of Example 15.

When the phosphorus (P) content in the surface of the thin film of this stove baking sheet was measured using an electronic probe micro-analyzer (EPMA), it was 0.1 mass %.

Furthermore, the anti-stain properties of the stove baking sheet of this Example 15 were evaluated in conformity with Example 10. The evaluation results are shown in Table 2.

Comparative Example 3

The coating composition of Comparative Example 3 was obtained in conformity with Example 1, except that zirconium tetrabutoxide was changed to 1.5 mass parts, ethyl acetoacetate was changed to 0.8 mass parts, 2-propanol was changed to 96.6 mass parts, and tetramethoxysilane was changed to 1.1 mass parts.

In the coating composition of this Comparative Example 3, when the zirconium component and the silicon component were respectively converted to zirconium oxide ($ZrO_2$) and silicon oxide ($SiO_2$), the mass percent of the silicon oxide ($SiO_2$) relative to the total amount of zirconium oxide ($ZrO_2$) and silicon oxide ($SiO_2$) was 55 mass %.

Next, the stove baking sheet of Comparative Example 3 was obtained in conformity with Example 10, except that the coating composition of this Comparative Example 3 was used. The thickness of this thin film was 0.1 μm.

The anti-stain properties of the stove baking sheet of this Comparative Example 3 were evaluated in conformity with Example 10. The evaluation results are shown in Table 1. The "impregnation" in Table 1 indicates what results from the second manufacturing method.

Comparative Example 4

The dispersion liquid of Example 10 was applied by spray in an application amount of 100 g/m² onto a stove baking sheet made of crystallized glass. This was subjected to heat treatment and baking for 20 minutes at 500° C. in an ambient air atmosphere, and a thin film was formed on the stove baking sheet. The thickness of this thin film was 0.1 μm.

Next, a lithium hydroxide solution of 5 mass % was applied in an application amount of 50 g/m² onto this thin film, heat treatment was conducted for 20 minutes at a temperature of 250° C., and a thin film containing lithium in the surface was formed to obtain the stove baking sheet.

The anti-stain properties of the stove baking sheet of this Comparative Example 4 were evaluated in conformity with Example 10. The evaluation results are shown in Table 1.

TABLE 2

| | Amount (mass %) of SiO₂ in thin film | Phosphorus treatment | Ease of removal of burnt-on stains | |
|---|---|---|---|---|
| | | | 250° C. | 350° C. |
| Example 10 | 5 | Impregnation | Very good | Very good |
| Example 11 | 45 | Impregnation | Good | Good |
| Example 12 | 0 | Impregnation | Very good | Very good |
| Example 13 | 5 | Application | Very good | Very good |
| Example 14 | 0 | Application | Very good | Very good |
| Example 15 | 0 (Zirconium oxide fine particles were used as the zirconium component) | Application | Very good | Very good |
| Comparative Example 3 | 55 | Impregnation | Poor | Poor |
| Comparative Example 4 | 5 | None (Lithium hydroxide treatment) | Very poor | Very poor |

According to Table 2, it was found in the stove baking sheets of Examples 10-14 that removal of burnt-on stains was easy under conditions of either 250° C. or 350° C., and that anti-stain properties were excellent compared to the stove baking sheets of Comparative Examples 3-4.

Moreover, in Comparative Examples 3-4, ease of removal of burnt-on stains was either poor or very poor whether at 250° C. or 350° C.

INDUSTRIAL APPLICABILITY

With respect to the cooking device of the present invention, as burnt-on food stains or oil stains that have adhered during cooking can be simply removed merely by wiping with a damp cloth by forming a thin film of specific composition including silicon (Si), zirconium (Zr), and oxygen (O) on at least part of the surface of the base material, application is not only possible with regard to cooking device and accessories of various types of kitchen equipment used in cooking food, but also to various types of members, parts, and the like apart from such cooking device that require anti-stain properties, and the industrial significance thereof is quite large.

Moreover, with respect to the anti-stain product of the present invention—i.e., cooking device—by applying to the surface of the base material that constitutes its principal part either a thin film of specific composition containing silicon (Si), zirconium (Zr), oxygen (O), and phosphorus (P), or a thin film of specific composition containing zirconium (Zr), oxygen (O), and phosphorus (P), it is possible to prevent fixation of burnt-on stains originating in organic matter such as food products to the surface of the base material, and conduct easy removal by water washing even if such burnt-on stains have been affixed to the base material, thereby enabling application not only to various types of cooking device such as stove baking sheets, but also to various types of cooking device, and the industrial significance thereof is quite large.

The invention claimed is:

1. A cooking device comprising a base material and a thin film that is formed on a surface of this base material, wherein:
    said thin film contains silicon (Si), zirconium (Zr) and oxygen (O), and is such that when said silicon (Si) and said zirconium (Zr) are respectively converted to silicon oxide ($SiO_2$) and zirconium oxide ($ZrO_2$), the weight percent of said silicon oxide ($SiO_2$) relative to the total amount of said zirconium oxide ($ZrO_2$) and said silicon oxide ($SiO_2$) is 1 weight % or more and 10 weight % or less, and
    a thickness of said thin film is 0.01 to 10 μm.

2. The cooking device according to claim 1, wherein said thin film further contains phosphorus (P), and said phosphorus (P) is distributed at least in the surface layer of said thin film.

3. The cooking device comprising according to claim 1, wherein said thin film contains zirconium (Zr), oxygen (O) and phosphorus (P), and said phosphorus (P) is distributed at least in the surface layer of said thin film.

4. A cooking device comprising a base material and a thin film that is formed on a surface of this base material, wherein:
    said thin film contains silicon (Si), zirconium (Zr) and oxygen (O), and is such that when said silicon (Si) and said zirconium (Zr) are respectively converted to silicon oxide ($SiO_2$) and zirconium oxide ($ZrO_2$), the weight percent of said silicon oxide ($SiO_2$) relative to the total amount of said zirconium oxide ($ZrO_2$) and said silicon oxide ($SiO_2$) is 1 weight % or more and 20 weight % or less,
    said thin film further contains phosphorus (P), and
    said phosphorus (P) is distributed at least in the surface layer of said thin film.

* * * * *